United States Patent
Swars

[11] Patent Number: 5,134,900
[45] Date of Patent: * Aug. 4, 1992

[54] CRANKSHAFT WITH HOLLOW PINS

[75] Inventor: Helmut Swars, Bergisch Gladbach, Fed. Rep. of Germany

[73] Assignee: Emitec Gesellschaft für Emissionstechnologie mbH, Lohmar, Fed. Rep. of Germany

[*] Notice: The portion of the term of this patent subsequent to May 14, 2008 has been disclaimed.

[21] Appl. No.: 431,646

[22] Filed: Nov. 3, 1989

[30] Foreign Application Priority Data

Nov. 3, 1988 [DE] Fed. Rep. of Germany ....... 3837292

[51] Int. Cl.⁵ .............................................. F16C 3/10
[52] U.S. Cl. ...................................... 74/597; 74/595; 29/888.08
[58] Field of Search .................. 74/595–598, 74/603; 29/6.1, 447, 888.08

[56] References Cited

U.S. PATENT DOCUMENTS

| | | | |
|---|---|---|---|
| 1,891,505 | 12/1932 | Scudder | 74/595 |
| 2,013,039 | 9/1935 | Dusevoir | 74/598 |
| 2,309,047 | 1/1943 | Culbertson | 74/597 |
| 2,326,866 | 8/1943 | Kincaid, Jr. | 287/124 |
| 2,365,394 | 12/1944 | Criswell | 74/595 |
| 3,686,971 | 8/1972 | Strehler et al. | 74/597 |
| 4,512,290 | 4/1985 | Ficht et al. | 74/597 |

FOREIGN PATENT DOCUMENTS

| | | |
|---|---|---|
| 587859 | 11/1933 | Fed. Rep. of Germany . |
| 589451 | 12/1933 | Fed. Rep. of Germany . |
| 3737600 | 5/1989 | Fed. Rep. of Germany ........ 74/595 |
| 0371288 | 3/1939 | Italy ...................... 74/598 |
| 5740924 | 11/1979 | Japan . |
| 0103112 | 8/1980 | Japan ................... 74/595 |
| 5755923 | 5/1981 | Japan . |
| 220683 | 9/1968 | U.S.S.R. . |

Primary Examiner—Leslie A. Braun
Assistant Examiner—Winnie Yip
Attorney, Agent, or Firm—Akoo-Toren

[57] ABSTRACT

In the case of a crankshaft with hollow pins, cross-sectionally distributed expanding sleeves inserted into the exit apertures of the main pins and crank pins in the crank webs. These sleeves generate a prestress in the material of the crank webs in order to increase the bending and torsional strength and to avoid the formation of cracks in the endangered shaft cross-section. Further expanding means in the pins extending along the length of the pins increase the natural frequency of the shaft in uncritical areas.

19 Claims, 5 Drawing Sheets

CRANKSHAFT WITH HOLLOW PINS

BACKGROUND OF THE INVENTION

The invention relates to a crankshaft with hollow pins having through-apertures emerging in the crank webs.

For reasons of costs, such crankshafts are used to an increasing extent to reduce weight, inertia moments, and to save material. The shafts may be cast or forged with through-apertures from the start, or the apertures may be drilled in subsequently, and they may be produced in one single part or in individual portions joined subsequently.

Crankshafts of the above type, even more so than conventional solid crankshafts, are subject to the problems of an insufficient bending and torsional strength under high loads and to the risk of crack formation in the region of the pin projections at the crank webs. This risk is intensified by the possibility of deformation of the hollow pin cross-section under the influence of gas forces and centrifugal forces.

SUMMARY OF THE INVENTION

Accordingly, it is an object of the present invention to further develop a crankshaft of the said type in such a way that increased loads may be applied while retaining a favorable weight and that counter measures are taken to eliminate the above risks. Pursuant to this object, and others which will become apparent hereafter, one aspect of the present invention resides in expanding means inserted into apertures in the crank webs in the region of the main pins and crank pins so as to be distributed across the cross-sections of the webs. Expanding means can also be inserted into apertures outside the pin cross-sections, which expanding means, especially together with the expanding means in the through-apertures of the main pins and/or crank pins, generate and maintain a permanent prestress in the material of the crank webs and of the crank pins.

By generating such a uniformly distributed permanent prestress in the base material of the crankshaft and especially also in the crank webs, which may be generated by suitable expanding means to be explained at a later stage, the bending and torsional stiffness of the shaft is substantially increased while at the same time achieving further weight savings. The prestressed, pressure-exerting expanding means cause the hollow shaft to be stiffened from the inside, thereby preventing local stress peaks combined with the risk of crack initiations as a result of the effect of indentations. The stiffening effect of the prestressed expanding means ensures that disadvantageous stress peaks are distributed, made uniform and moved away from the critical crack-sensitive regions in the area of transition from the pins to the webs into other web regions. In this way it is possible to avoid the occurrence of cyclic stresses in the regions at risk because, with a suitable design, the stress changes may be kept below the prestress level. Regarding the formation of cracks, stress values fluctuating around a positive or negative value are less critical for the base material than a cyclic tensile-compressive stress. Furthermore, the material prestress has an advantageous effect in that the natural frequency of the crankshaft is increased so that the hollow shaft, which is also critical in this respect, is provided with an increased natural frequency which is more favorable relative to the excitation range determined by the operational speed of the crankshaft.

According to an advantageous embodiment of the invention, the expanding means inserted into the exit apertures of the main pins and crank pins in the region of the crank webs take the form of a number of sleeves generating a prestress in the material of the crank webs which is essentially uniformly distributed across the web cross-section or at least the web circumference. Such expanding means specifically influences the critical, crack-sensitive region of the crankshaft with the help of a superimposed compressive prestress so that this is a preferred application for the means in accordance with the invention.

The expanding means may also take the form of conical discs which, in the sense of being pressed to be planar, are subjected to elastic or plastic deformation, so as to be radially enlarged. In the simplest embodiment, these may be conical plate metal discs which are inserted into the exit apertures in the crank webs and flattened mechanically. A further possibility involves using conical discs which are arranged in pairs in opposite directions and tensioned centrally relative to each other, with one pair of discs being inserted and tensioned in two adjoining webs, but it is also possible to insert a closely adjoining pair of discs in the region of one web into each exit aperture. Tensioning may be achieved by threaded tie rods or by an intermediate sleeve which connects the conical discs so as to form one part and which is expanded mechanically or hydraulically. In any case, the effect is achieved by flattening the conical or curved discs by pulling or pressing. The latter should be positioned in one plane in the exit apertures of a crank pin and a main pin in a crank web.

In combination with the web stiffening and in addition to the expanding means in the exit apertures in the main and crank pins, further expanding means positioned outside the pin cross-sections are provided in apertures in the crank webs. Again, these may be round sleeves or round pins. However, with an approximately round or oval crank web shape, which is very advantageous, these expanding members preferably have a gusset- or sickle-shaped cross-section. To allow them to be pressed in axially, they may be conical or prismatic. The process of inserting them may also be accompanied by generating a prestress following thermal pretreatment by shrinking or waxing the parts inserted into each other when temperature balancing takes place. It is particularly important to aim at a uniform stress distribution in the surface zone of the crank webs.

According to a further embodiment, expanding means in the form of sleeves causing a tangential tensile prestress also in the material of the main and crank pins have been inserted into the cylindrical portions of the main and crank pins. It can be seen that the previously mentioned expanding means inserted into the apertures in the crank webs already partially exert this effect. In a preferred embodiment, the expanding means for the pins take the form of cylindrical sleeves which are plastically expanded beyond their limit of elasticity. While this design requires only small amounts of material, as well as relatively cheap material, it improves the bending, buckling and torsional stiffness in the region of the pins. It should be emphasized that the detail referred to here relates in particular to single-piece crankshafts bored or cast to be hollow. In a special crankshaft embodiment assembled from portions, the stiffening sleeve element generating the tangential tensile stress in the pin may at the same time generate the prestress for connecting pin components inserted into each other.

Whereas above, the conical discs are exclusively used as expanding means in the region of the crank webs, with the cylindrical sleeves being the preferred expanding elements in the region of the pins, it should be pointed out that both elements may be interchanged, i.e. it is also possible to insert into the pins an assembly of individual, expandable disc members and to use expandable sleeves preferably in the region of the crank webs. These may not only be expanded hydraulically, but they may also be expanded plastically by mechanical expanding means against the elastic deformation of the base material. Furthermore, it is also possible to combine sleeves with additionally inserted disc members or plugs, thereby additionally stiffening the round hollow member regions against taking on an oval shape.

Whereas plastic expansion of the sleeves against the elastic prestress of the shaft material is given as a preferred production process in the case of which materials with an outwardly increasing yield point have to be selected, a thermal joining process (shrinking, waxing) of the parts inserted into each other and having different temperatures is equally suitable. Furthermore, it is possible to use the axial pressing-in process — to the extent that it is available — for producing press fits.

In a further embodiment of the expanding or tensioning elements which is particularly suitable for composite crankshafts divided in the region of the pins, stepped sleeves are provided which are connected to each other and which extend through both through-apertures in the pins and exit apertures in the crank webs, especially with a reduced diameter. Because of the overlap of main pins and crank pins, a preferred embodiment provides for several semi-circular, eccentrically arranged round apertures in the crank webs. These apertures may be provided with individual, expandable sleeves. By using radial disc parts or the previously mentioned conical discs it is possible to separate enclosed chambers within the hollow crank pins, which, according to a further preferred embodiment, may be filled with a vibration-damping material, for instance a ceramic or plastic granulate.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DETAILED DESCRIPTION OF THE PREFERRED EMBODIMENTS

Figure 1:
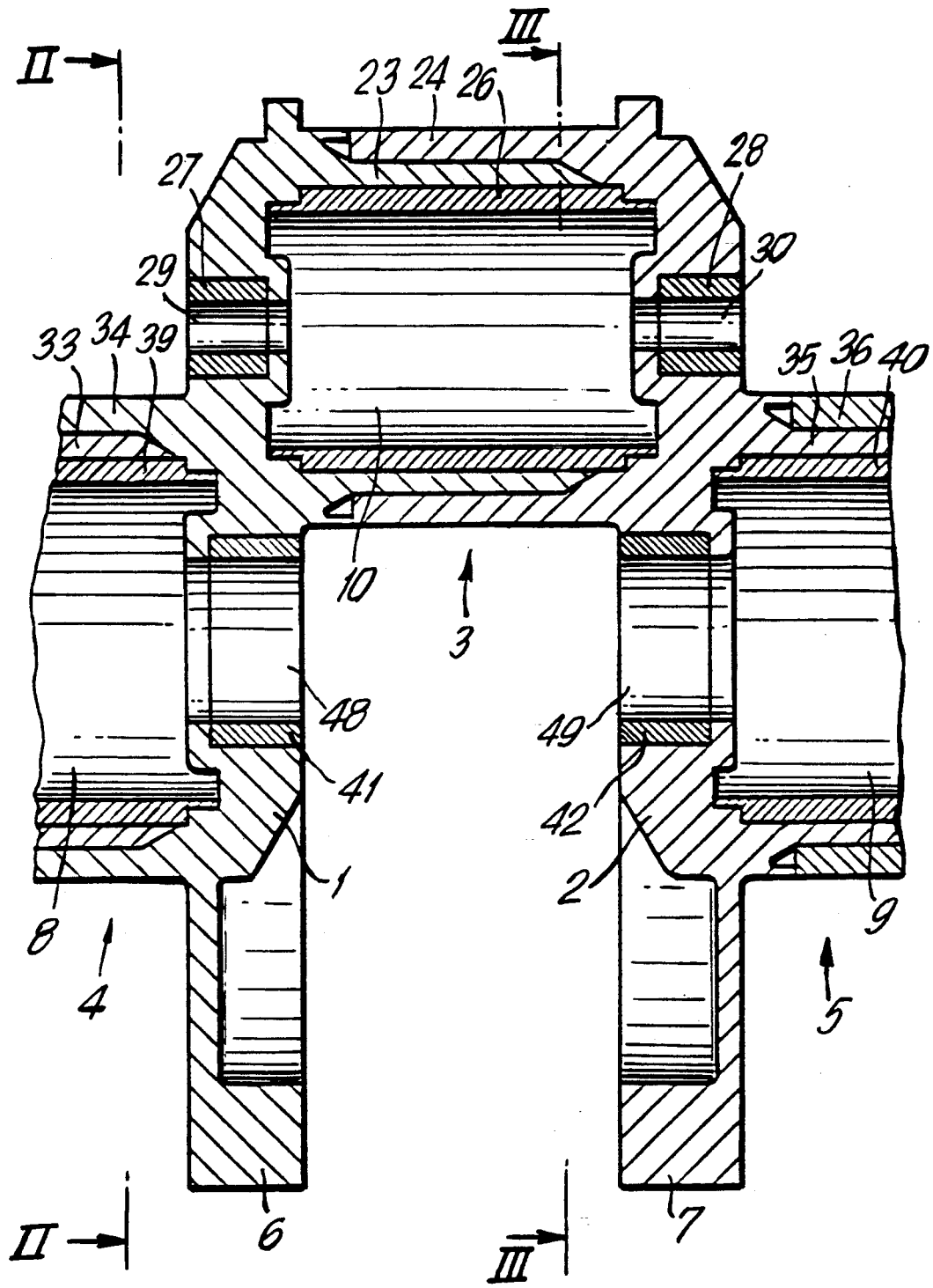
FIG. 1 shows a crankshaft portion having sleeves as tensioning and connecting elements.

FIG. 1 shows a crankshaft portion comprising two crank webs 1, 2 which are connected via a crank pin 3 and followed by hollow main pins 4, 5. The crank webs have been provided with counter weights 6, 7. The crank pin 3 is composed of pin projections 23, 24 which are slid into each other and which are connected and pretensioned by an inserted sleeve 26. Cylindrical sleeves 27, 28 which are independent of the sleeve 26 are inserted into the exit apertures 29, 30 of the through-aperture 10 and expanded mechanically or preferably hydraulically, like the sleeve 26. Like the crank pin 3, the main pins 4, 5 are assembled of pin projections 33-34, 35-36 which are slid into each other and into each of which an expanded sleeve 39, 40 is inserted for the purpose of generating a pretension and for connecting the pin projections. Independently of the expanded sleeve 39, 40, cylindrical sleeves 41, 42 are inserted into the through-apertures 48, 49 in the region of the crank webs, which are also hydraulically or mechanically plastically deformed and generate a pretension in the region of the crank webs.

Figure 2:
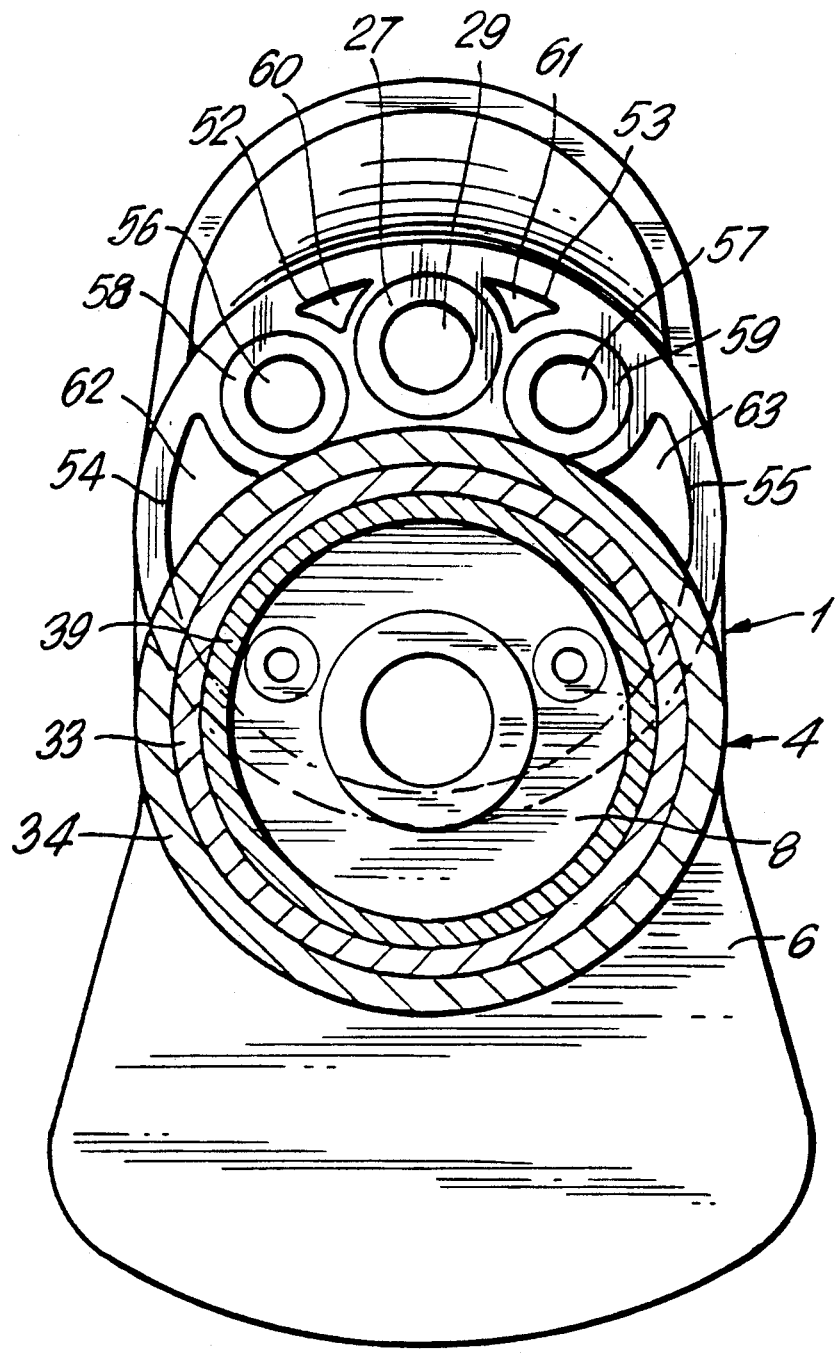
FIG. 2 is a cross-section A—A according to FIG. 4.

FIG. 2 shows a section along line A—A in FIG. 1, of the main pin 4 which is assembled of the pin sleeves 33, 34 and into which a connecting and pretensioning element has been inserted in the form of the sleeve 39. The crank web 1 is shown in plan view, and in addition to the exit aperture 29 of the hollow crank pin there have been provided further round exit apertures 56, 57 which are expanded and pretensioned by further sleeves 58, 59, similar to the exit apertures 29 which are expanded and pretensioned by the sleeve 27. Furthermore, it can be seen that there are structures in the crank web in the form of rib-forming, non-continuous recesses or through-apertures 52, 53, 54, 55 into which expanding means in the form of formed parts 60, 61, 62, 63 are inserted.

Figure 3:
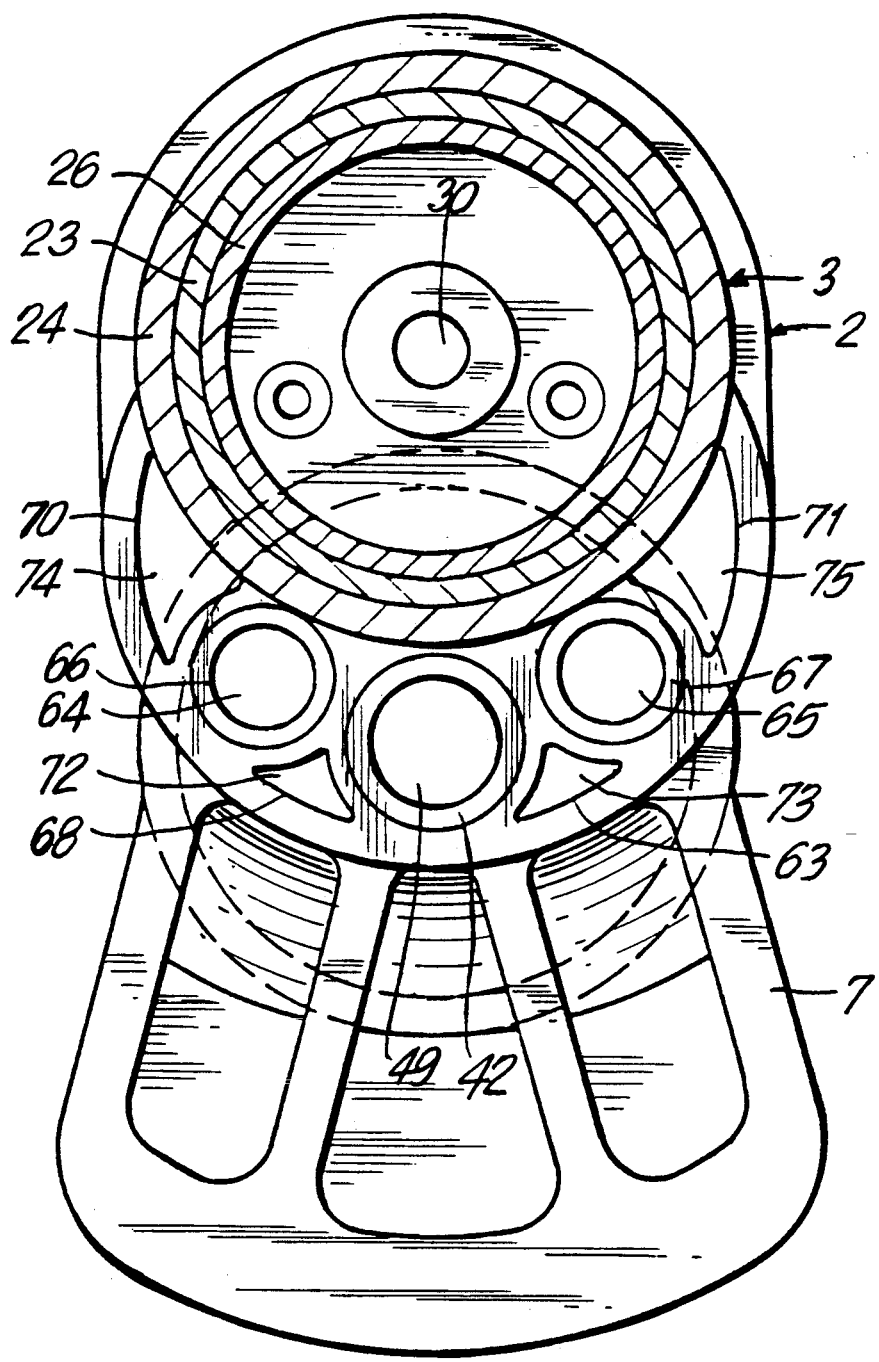
FIG. 3 is a cross-section B—B according to FIG. 4.

FIG. 3 shows a section along line B—B in FIG. 1, of the crank pin 3 which is assembled of pin sleeves 23, 24, provided with an inner sleeve 26 acting as a pretensioning element and which reveals the exit aperture 30. The crank web 1 illustrated in the form of a plan view, in addition to the through-aperture 49 provided with a sleeve 42, comprises two further exit apertures 64, 65 which are also provided with expanding sleeves 66, 67. Further structures designed as non-continuous, rib-forming recesses 68, 69, 70, 71 are pretensioned by formed parts 72, 73, 74, 75 acting as expanding means.

FIG. 4 again shows a crankshaft with two crank webs 1, 2 connected via a crank pin 3 and followed by main pins 4, 5, with the crank webs being provided with counter weights 6, 7. The crank pin 3 consists of pin projections 23, 24 which are slid into each other and which, furthermore, are embraced by a sleeve 25 made of a high-tensile material of bearing grade which at the same time accommodates high pretensioning forces.

The through-aperture 10 in the crank pin is followed by a stepped sleeve 26 having a central region fittingly inserted into the pin projections and adjoining cylindrical portions 27, 28 with a smaller diameter which extend into the exit apertures 29, 30 in the crank webs. Plastic expansion of the sleeve 26 and the pin projection 23 as well as of the pin connections 27, 28, especially by hydraulic means, causes a tensile prestress in the material of the pin projection 24 and the sleeve 25 as well as in the region of the crank webs 1, 2. The exit aperture 30 in the sleeve portion 28 has additionally been provided with a conical disc 50 which, by additionally being deformed plastically, e.g. by mechanical flattening, may intensify the prestress and help to stiffen the cylindrical bore. The stepped sleeve produced annular cavities 31, 32 inside the crank pin which may be filled with a vibration-damping material.

The main pins 4, 5, like the crank pin 3, are assembled from pin projections 33-34, 35-36 which are integral with a crank web and which, again, are jointly embraced by a bearing sleeve 37, 38. The through-apertures 8, 9 are provided with sleeves 39, 40 which are designed similarly to the stepped sleeve 36 and which each reveal a sleeve projection 41, 42 with a smaller diameter entering an exit aperture 48, 49 in the region of the crank webs. Plastic expansion of both the sleeves 39, 40 and the pin projections 34, 35 serves to generate a prestress in the pin projections 33, 36 and the sleeves 37, 38 while at the same time connecting the pin projections to each other and generating a prestress in the crank webs. In the crank web 2, two conical discs 43, 44 have simultaneously been inserted into the sleeve projection 42, which, by a connecting sleeve 45, are connected to each other to form one piece. Mechanical or hydraulic expansion of the sleeve 45 results in the discs 43, 44 being flattened, thereby causing further pretensioning of the sleeve projection 42 and stiffening of the cylindrical bore. Again, the sleeve 39, 40 produce annular cavities 46, 47 which may be filled with a vibration-damping material.

Figure 5:
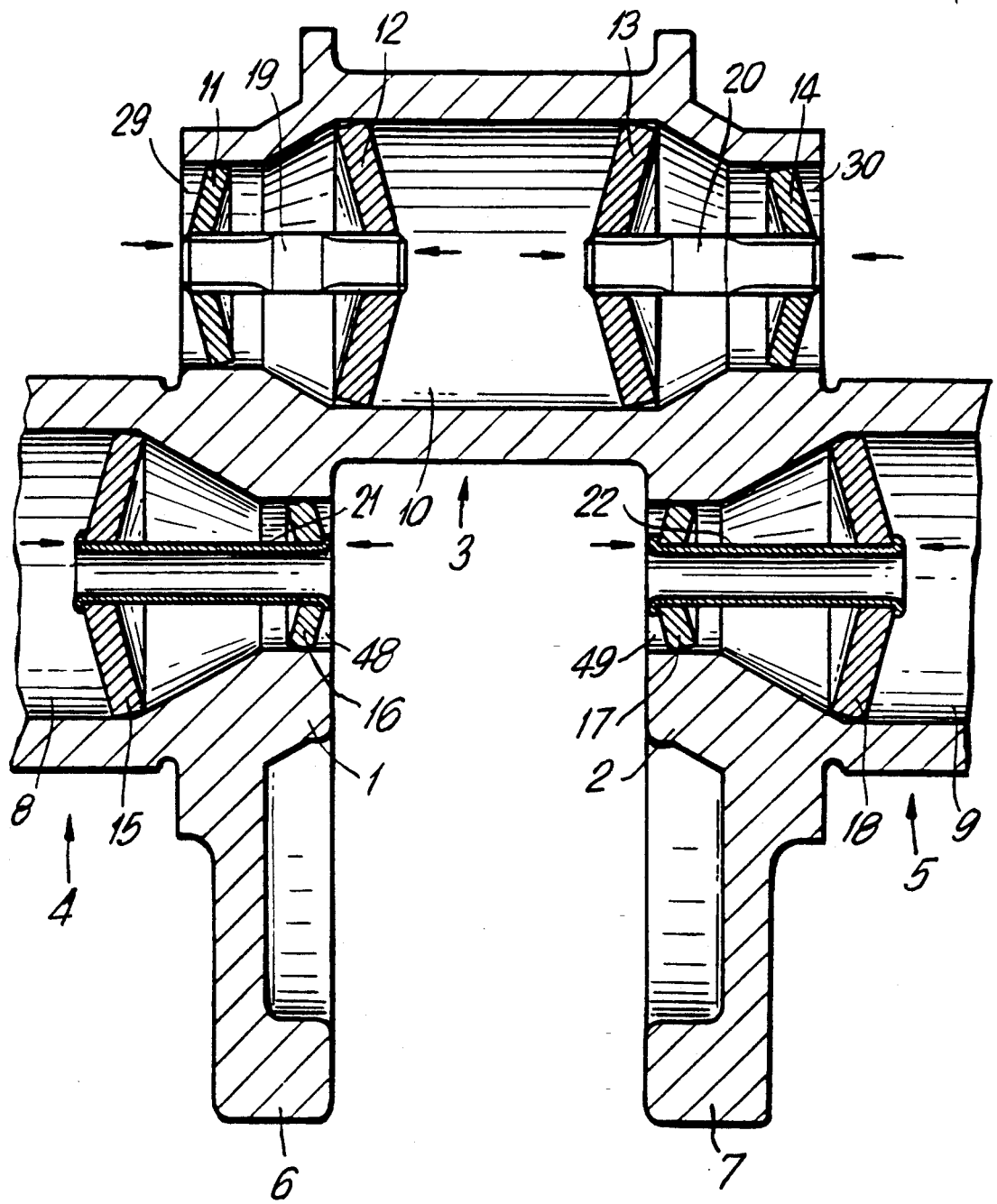
FIG. 5 illustrates a crankshaft portion having conical discs as tensioning elements.

FIG. 5 shows a portion of a crankshaft, produced in one piece, in the region of two crank webs 1, 2 which are connected to each other via a crank pin 3 and which are followed by projections of the main pins 4, 5. The crank webs 1, 2 comprise counter weights 6, 7 arranged outside the crank pin 3. The main pins 4, 5 in the region of the crank webs, comprise through-apertures 8, 9 which are reduced in size. The crank pin 3 comprises a continuous, stepped through-aperture 10. The exit apertures 48, 49 of the main pins 4, 5 in the region of the crank webs 1, 2 are provided with conical discs 15-16, 17-18 arranged in pairs to face opposite directions. The exit apertures 29, 30 in the aperture 10 in the crank pin 3 are provided with corresponding conical discs 11-12, 13-14 arranged in pairs so as to face opposite directions. In the disc pairs in the through-aperture 10 of the crank pin 3, threaded rods 19, 20 with opposite pitches are inserted for tensioning the discs relative to each other, and the disc pairs in the through-apertures 8, 9 of the main pins 4, 5 are tensioned relative to each other by hollow sleeves 21, 22. Similar means are always available. The shape of the through-apertures as illustrated, with an outwardly reduced diameter, in the case of forged crankshafts, means that the crankshaft has to be assembled in the region of the pins, for example by butt-welding in the region of the central pin plane.

Figure 4:
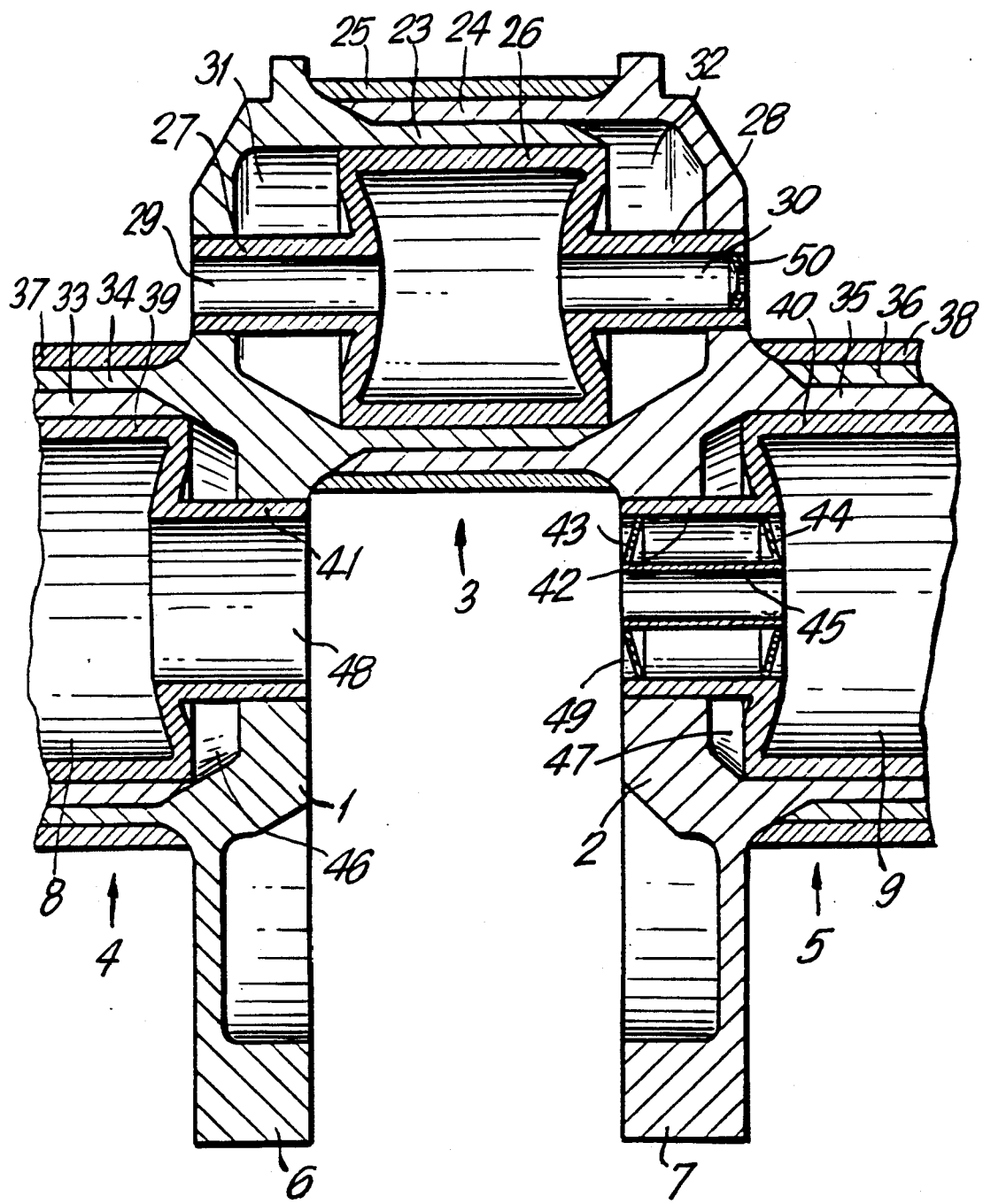
FIG. 4 shows a crankshaft portion having sleeves and conical discs as tensioning elements.

In the embodiments of FIGS. 4 and 5, too, further expanding means have been inserted and expanded or pressed in axially into further apertures in the crank webs outside the sectional plane.

While the invention has been illustrated and described as embodied in a crankshaft with hollow pins, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by letters patent is set forth in the appended claims.

1. A crankshaft, comprising:
crank webs;
crank pins (3) connecting the crank webs and having through apertures emerging in the crank webs;
hollow main pins having through-apertures emerging in the crank webs;
expanding means (27, 28, 41, 42, 58, 59, 60, 61, 66, 67, 72, 73) inserted into an exit of the through-apertures (29, 30, 48, 49, 52, 53, 56, 57, 64, 65, 68, 69) in the crank webs (1, 2) in regions of the main pins (4, 5) and the crank pins (3), distributed across cross-sections of the crank webs, for generating and maintaining a permanent prestress in the material of the crank webs, the crank webs (1, 2) having additional, non-through apertures (54, 55, 70, 71) outside the cross-sections of the pins between the through-apertures (29, 30, 48, 49, 52, 53, 56, 57, 64, 65, 68, 69) in the regions of the crank pins and crank webs; and
further expanding means (62, 63, 74, 75) inserted in said additional non-through apertures for generating and maintaining a permanent prestress in the material of the crank webs.

2. A crankshaft according to claim 1, and further comprising an additional expanding means (26, 39, 40) inserted into the through apertures (8, 9, 10) in at least one of the main pins (4,5) and the crank pins (3), for generating and maintaining a permanent prestress in the material of the crank pins and the main pins.

3. A crankshaft according to claim 2, wherein the additional expanding means includes cylindrical sleeves (26, 39, 40) which are deformed.

4. A crankshaft according to claim 3, wherein the cylindrical sleeves are deformed beyond their limit of elasticity.

5. A crankshaft according to claim 1, wherein the expanding means in the crank webs (1, 2) includes cylindrical sleeves (27, 28; 41, 42; 58, 59, 66, 67) which are plastically expanded in a radial direction relative to an axis of said sleeves.

6. A crankshaft according to claim 5, wherein the sleeves are expanded beyond their limit of elasticity.

7. A crankshaft according to claim 4, and further comprising central sleeve portions (26; 39; 40) integral with the cylindrical sleeves (27, 28; 41, 42) and arranged in the through-apertures so as to serve as further expanding means and as tensioning means for the crank and main pins (3, 4, 5).

8. A crankshaft according to claim 7, wherein the expanding means for the composite main pin (4, 5) includes the central sleeve (39, 40) with a larger diameter and the cylindrical sleeves (41; 42) with a smaller diameter adjoining at both ends of the central sleeve.

9. A crankshaft according to claim 7, wherein the small diameter sleeves and the larger diameter sleeves are adjoined coaxially.

10. A crankshaft according to claim 7, wherein the expanding means forms cavities (31, 32, 46, 47) which are filled with a vibration-damping material.

11. A crankshaft according to claim 10, wherein the vibration-damping material is a granulate consisting of one of ceramic and plastic.

12. A crankshaft according to claim 1, wherein the expanding means and the further expanding means include formed members which have one of a round, a sickle-shaped and a triangular-like cross-section, and which in a longitudinal direction, have one of a conical and a prismatic shape and are under permanent pretension.

13. A crankshaft according to claim 1, wherein the crankshaft is a one piece forging or casting.

14. A crankshaft according to claim 2, wherein the crankshaft is comprised of individual portions which are forged and butt-welded in a region of at least one of the crank pins and main pins.

15. A crankshaft according to claim 1, wherein the crankshaft is comprised of individual portions provided with pin elements of at least one of the crank pins and main pins (3, 4, 5) which are one of inserted into each other, tensioned relative to each other and soldered together.

16. A crankshaft, comprising:
crank webs;
crank pins (3) connecting the crank webs and having through-apertures emerging in the crank webs;
hollow main pins having through-apertures emerging in the crank webs; and
expanding means (27, 28, 41, 42, 58, 59, 60, 61, 66, 67, 72, 73) inserted into the through-apertures (29, 30, 48, 49, 52, 53, 56, 57, 64, 65, 68, 69) in the crank webs (1, 2) in regions of the main pins (4, 5) and the crank pins (3), distributed across cross-sections of the crank webs, for generating and maintaining a permanent prestress in the material of the crank webs, the crank webs having additional, non-through apertures between the through apertures, the expanding means including conical discs (11-12, 13-14, 15-16, 17-18, 43-44) arranged in pairs to face opposite directions, and are radially enlarged by one of elastic and plastic deformation towards a planar disc.

17. A crankshaft according to claim 16, wherein the conical discs (11-12, 13-14, 15-16, 17-18, 43-44) are centrally axially tensioned relative to each other.

18. A crankshaft according to claim 17, wherein the conical discs (11-12, 13-14) are axially tensioned relative to each other by one of tie rods (19, 20) and hollow sleeves (21, 22).

19. A crankshaft according to claim 17, wherein the conical discs (43-44) are axially tensioned by expanded, formed-on connecting sleeves (45).

* * * * *